(12) United States Patent
Rinzler et al.

(10) Patent No.: US 6,282,822 B1
(45) Date of Patent: Sep. 4, 2001

(54) MOBILE ADVERTISING DISPLAY FOR ROLL-UP DOOR

(75) Inventors: Lyons Keith Rinzler, Marietta; Warren Childs, Jonesboro; Kenneth Worley, Lilburn; Robert Wright, Atlanta, all of GA (US)

(73) Assignee: Aegis Mobile Marketing, Atlanta, GA (US)

(*) Notice: Subject to any disclaimer, the term of this patent is extended or adjusted under 35 U.S.C. 154(b) by 0 days.

(21) Appl. No.: 09/282,075

(22) Filed: Mar. 30, 1999

(51) Int. Cl.[7] ....................................... G09F 17/00
(52) U.S. Cl. .......................... 40/590; 40/603; 160/394
(58) Field of Search .......................... 40/590, 603, 604; 160/394, 392, 397, 395, 378, 329, 382, 383, 403, DIG. 6

(56) References Cited

U.S. PATENT DOCUMENTS

| | | | |
|---|---|---|---|
| 2,655,749 | * 10/1953 | Fontaine | 160/403 |
| 3,464,480 | 9/1969 | Kuss | 160/368 |
| 3,851,848 | 12/1974 | Wiele | 248/273 |
| 4,053,008 | 10/1977 | Baslow | 160/327 |
| 4,233,765 | 11/1980 | O Mullan et al. | 40/156 |
| 4,372,071 | 2/1983 | Vicino | 40/624 |
| 4,554,754 | 11/1985 | Stilling | 40/603 |
| 4,580,361 | 4/1986 | Hillstrom et al. | 40/603 |
| 4,648,573 | 3/1987 | Rubnerth | 248/273 |
| 4,674,213 | 6/1987 | Keithley | 40/603 |
| 4,754,566 | 7/1988 | Gordon | 40/603 |
| 4,756,107 | 7/1988 | Hillstrom | 40/603 |
| 4,800,947 | 1/1989 | Loomis | 160/368.1 |
| 4,828,316 | 5/1989 | Bennett et al. | 296/181 |
| 5,044,416 | 9/1991 | Murray | 160/22 |
| 5,058,299 | 10/1991 | Suzuki | 40/603 |
| 5,083,826 | 1/1992 | McCrary | 296/21 |
| 5,239,765 | 8/1993 | Opdahl | 40/603 |
| 5,245,774 | 9/1993 | Huber | 40/603 |
| 5,255,466 | 10/1993 | Synder | 40/603 |
| 5,349,772 | 9/1994 | Pardue | 40/590 |
| 5,373,653 | 12/1994 | Suzuki | 40/603 |
| 5,373,655 | 12/1994 | Suzuki | 40/603 |
| 5,398,436 | 3/1995 | Suzuki | 40/558 |
| 5,408,770 | 4/1995 | Suzuki | 38/102 |
| 5,507,109 | * 4/1996 | Rinzler | 40/603 |
| 5,876,291 | * 3/1999 | Dubose | 473/197 |
| 5,946,869 | * 9/1999 | Zinbarg | 52/3 |
| 6,092,319 | * 7/2000 | Hicks | 40/603 |

OTHER PUBLICATIONS

Color photographs of Mobile Media, Inc. advertising display; 5 pages, undated.

* cited by examiner

*Primary Examiner*—C. D.
(74) *Attorney, Agent, or Firm*—Needle & Rosenberg, P.C.

(57) ABSTRACT

An apparatus which may be used to display a visual image along the surface of a segmented door, includes a flexible display panel capable of carrying an image. One end of the display panel is connected to the door by a spline affixed to the display panel which is received in a complementary receiving member affixed to the door. Another end of the display panel is connected to the door by a plurality of spaced apart elastic members that connect the display panel to an attaching structure affixed to the door. Tension in the display panel throughout the range of motion of the door is regulated by the elastic members.

16 Claims, 8 Drawing Sheets

MOBILE ADVERTISING DISPLAY FOR ROLL-UP DOOR

BACKGROUND

1. Field of the Invention

The invention relates to advertising displays, and specifically, to an apparatus for displaying a visual image along the surface of a segmented door, such as a rear roll-up door of a truck, trailer, or van.

2. The Prior Art

Referring to FIG. 1, segmented roll-up doors 110 are common in many industries, including the trucking and transport industries, and their typical designs are well known. A typical door 110 has a leading edge 112, an opposite trailing edge 114, a first edge 116 transverse to the leading edge 112, an opposite second edge 118, an exterior surface 120, and an opposite interior surface (not shown). Many such doors consist of a plurality of elongated segments 122 linked to each other along their longitudinal sides 124 to form a substantially continuous door 110. The leading and trailing edges of the door 110 correspond to the longitudinal side 124 of the elongated segments 122 that form the exterior segments of the door 110, while the first edge 116 and second edge 118 correspond to the latitudinal edges 126 of the plurality of elongated segments 122. Because of its linked construction, the door 110 is flexible along the axis corresponding to the direction of the longitudinal sides 124 of the elongated segments 122. As a result, such doors 110 are suitable for roll-up applications. Roll-up doors are well known in the trucking and transport industries, and have been commonly utilized on the rear and sides of trailers and truck exteriors.

Systems for displaying advertising images on the exterior of moving vehicles such as vans, trucks, and trailers have been developed in response to ever-increasing demand for innovative advertising media. In addition to direct application of the advertisement to the vehicle exterior by painting or otherwise directly applying an adhesive film containing an advertisement, display systems have been developed wherein a sheet containing an advertisement is removably attached to the exterior surface of the vehicle. Such systems allow for removal of the advertisement without damage to the vehicle and allow rapid conversion between advertising displays. However, as most such systems utilize flexible advertising displays, maintenance of a consistent and controlled tension within the panel is critical, as excessive tension may cause failure of the panel or mounting hardware, and insufficient tension may allow sag, flutter, damage, or dislocation of the panel under use conditions.

Prior art mobile advertising display systems are not ideal for use in applications in which variations in tension across the panel are frequent. For instance, prior art systems are not tailored for use on a roll-up trailer door, such as one in which a segmented door that is substantially flat in the closed position is rolled along a curved path in reaching its open position. Prior art systems have the disadvantage that they were not designed to provide adequate release and restoration of tension within the display panel to allow retraction of the roll-up door without causing tearing or other damage to the display panel or failure of the mounting hardware.

SUMMARY OF THE INVENTION

The disadvantages of the prior art are overcome by the present invention which, in one aspect, is an apparatus for displaying images on a segmented roll-up trailer door. The door is defined by a leading edge, an opposite trailing edge, a first edge transverse to the leading edge, an opposite second edge, an exterior surface, and an opposite interior surface. A flexible display panel capable of carrying an image and having a first attaching area and a second attaching area is attached to the segmented door. A spline, affixed to the first attaching area of the display panel, is engaged by a receiving member that may be attached to the exterior surface of the door adjacent the leading edge. The receiving member defines a keyway which is complementary in shape to the spline. The second attaching area of the display panel is connected to an attaching structure, which may extend along the trailing edge of the door, by a plurality of spaced apart elastic members, which maintain and regulate tension in the panel throughout the range of motion of the door.

In another aspect, the invention includes an attaching member including a plurality of spaced apart eye-bolts, each affixed to the door along the trailing edge. The second attaching area of the display panel is defined by a plurality of spaced apart grommets passing there through. Each grommet defines an opening, engaging a plurality of elastic members, and has an elastic coupling capable of engaging a grommet. An S-hook engages each elastic coupling and connects the elastic coupling to an eye-bolt.

In yet another aspect, the invention includes an attaching member that is substantially L-shaped in cross section. The attaching member includes a first elongated plate attached to the door along the trailing edge and a second elongated plate transversely extending from the first elongated plate member. The second elongated plate defines a plurality of spaced apart holes extending there through, wherein each hole is capable of engaging an elastic member.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
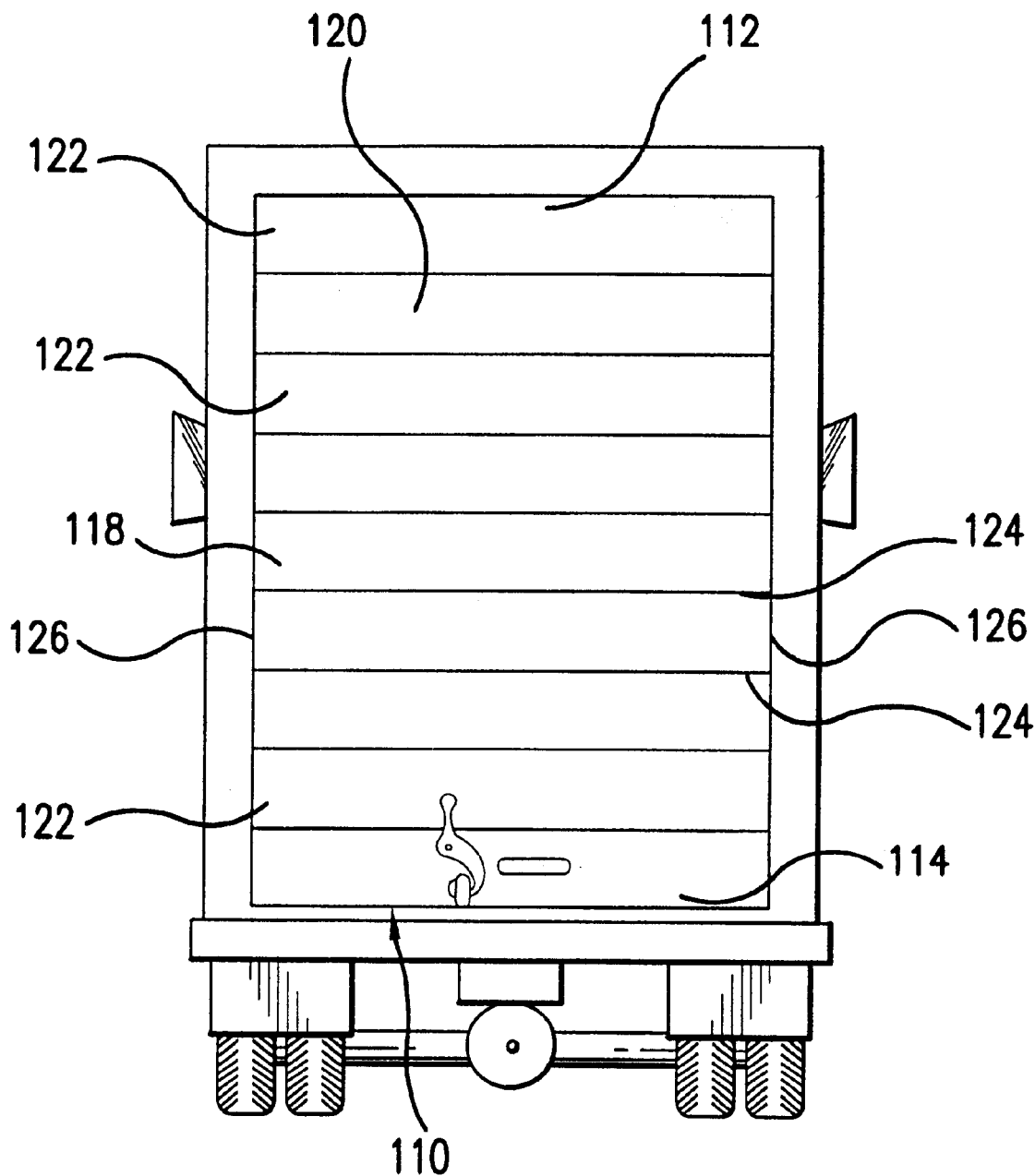
FIG. 1 is a schematic view of a prior art rear roll-up door of a tractor trailer.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
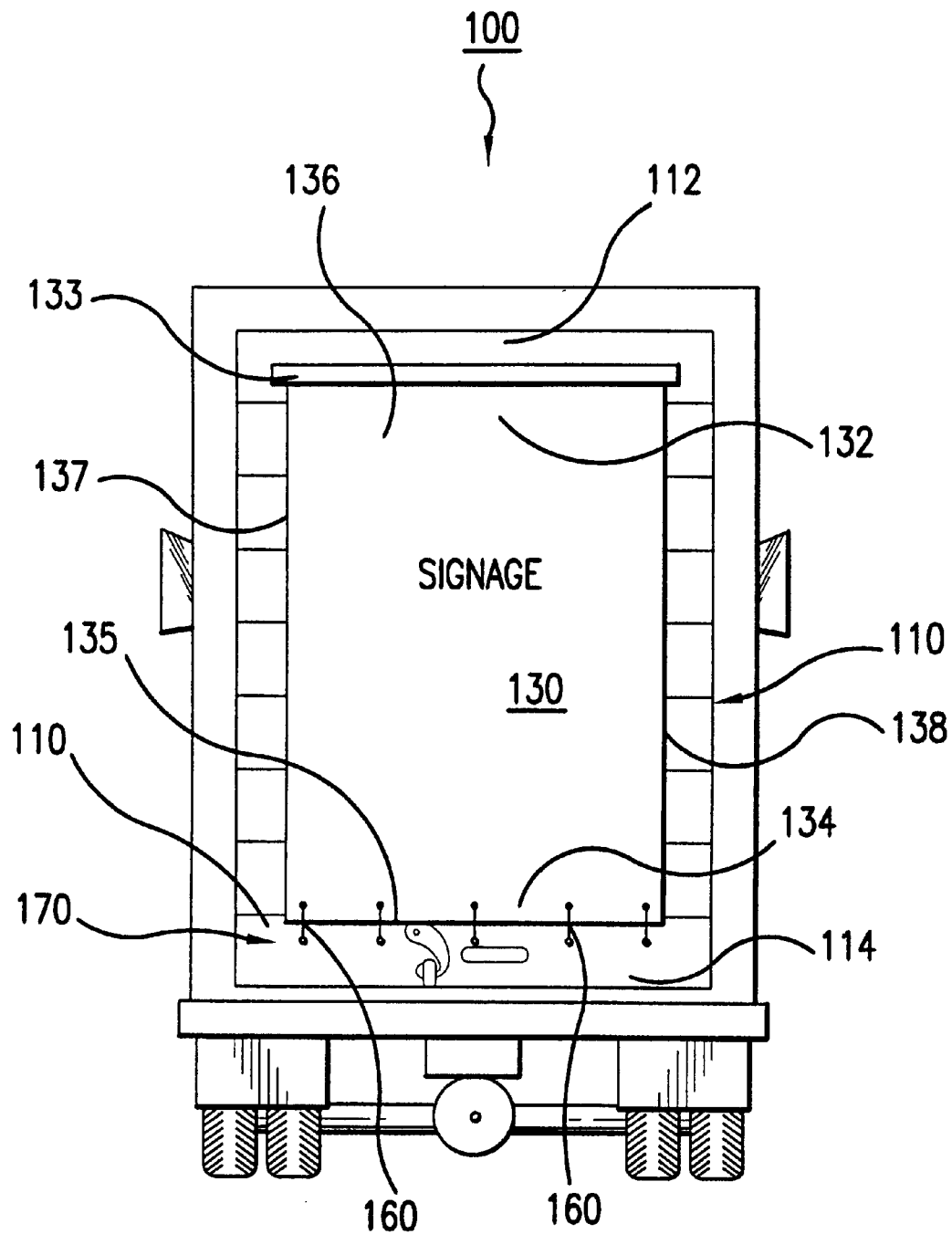
FIG. 2 is a schematic view of an embodiment according to the present invention installed on a rear roll-up door of a tractor trailer.

As shown in FIG. 2, in one embodiment, the invention is an apparatus 100 for displaying images on a segmented roll-up door 110. One embodiment of the invention includes a flexible display panel 130 having a first attaching area 132, an opposite second attaching area 134, a first surface 136, and an opposite second surface (not shown), in which the first surface 136 and the second surface are each capable of carrying an image. The panel 130 may be of any shape desired by the user, including rectangular, square, or circular. Any panel 130 shape capable of connection to the door 110 as described herein may be interchangeably utilized according to the invention. In the disclosed embodiment, the panel 130 has a generally similar shape to the door 110, but is smaller than the door 110 so that the perimeter of the panel 130 does not extend beyond the perimeter of the door 110. The panel 130 comprises a first attaching edge 133, an opposite second attaching edge 135, a first side edge 137, an opposite second side edge 138, a first surface 136 and an opposite second surface (not shown), the first surface 136 and the second surface each capable of carrying an image.

The "display panel" 130 may be constructed of any material capable of carrying an image thereon. The panel 130 may be capable of carrying an image on the first surface 136 or on the second surface, or on both surfaces such that the panel is reversible and may be installed with either the first 136 or second surface facing exteriorly of the door 110. Typically, the panel 130 will be made from a material that is capable of withstanding unfavorable weather conditions and strain caused by dynamic air flow around the panel 130. Such materials could include a vinyl laminated, coated or extruded polyester fabric, or a vinyl laminated, coated or extruded nylon fabric. The panel 130 should also be flexible, to allow for travel of the panel 130 along the non-linear path followed by the door 110. The advertising image may be applied to the panel 130 by hand painting, by automated or computerized printing, or by other techniques generally known to the art of display advertising.

Figure 3A:
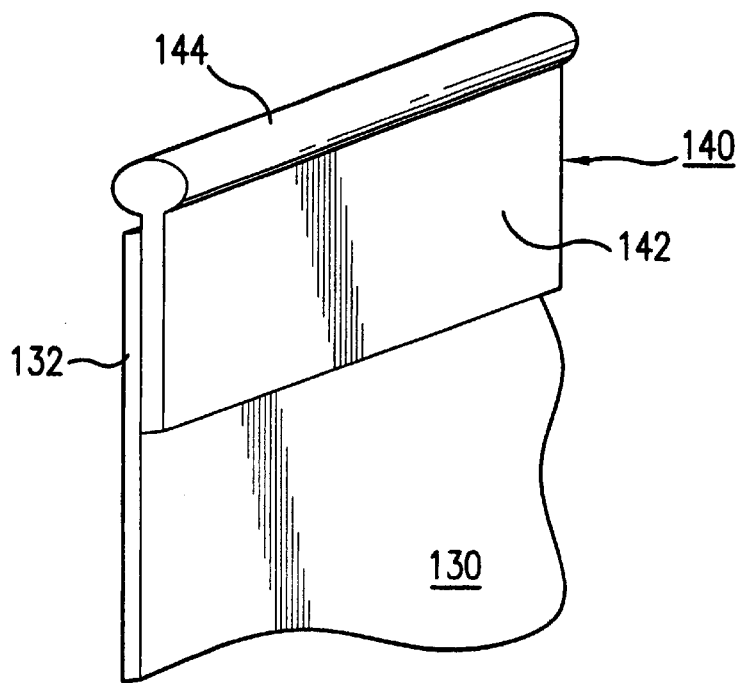
FIG. 3A is a schematic view of a first embodiment of the spline as it engages the display panel.
Figure 3B:
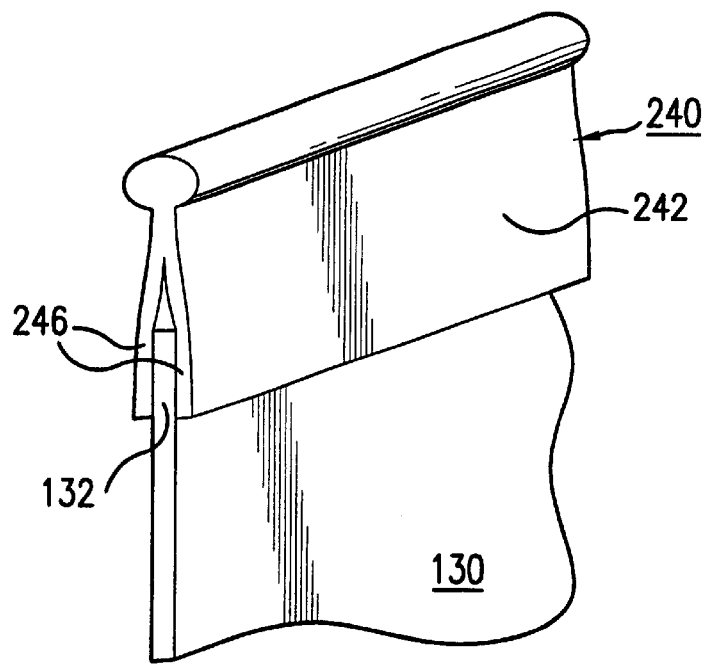
FIG. 3B is a schematic view of a second embodiment of the spline as it engages the display panel.
Figure 3C:
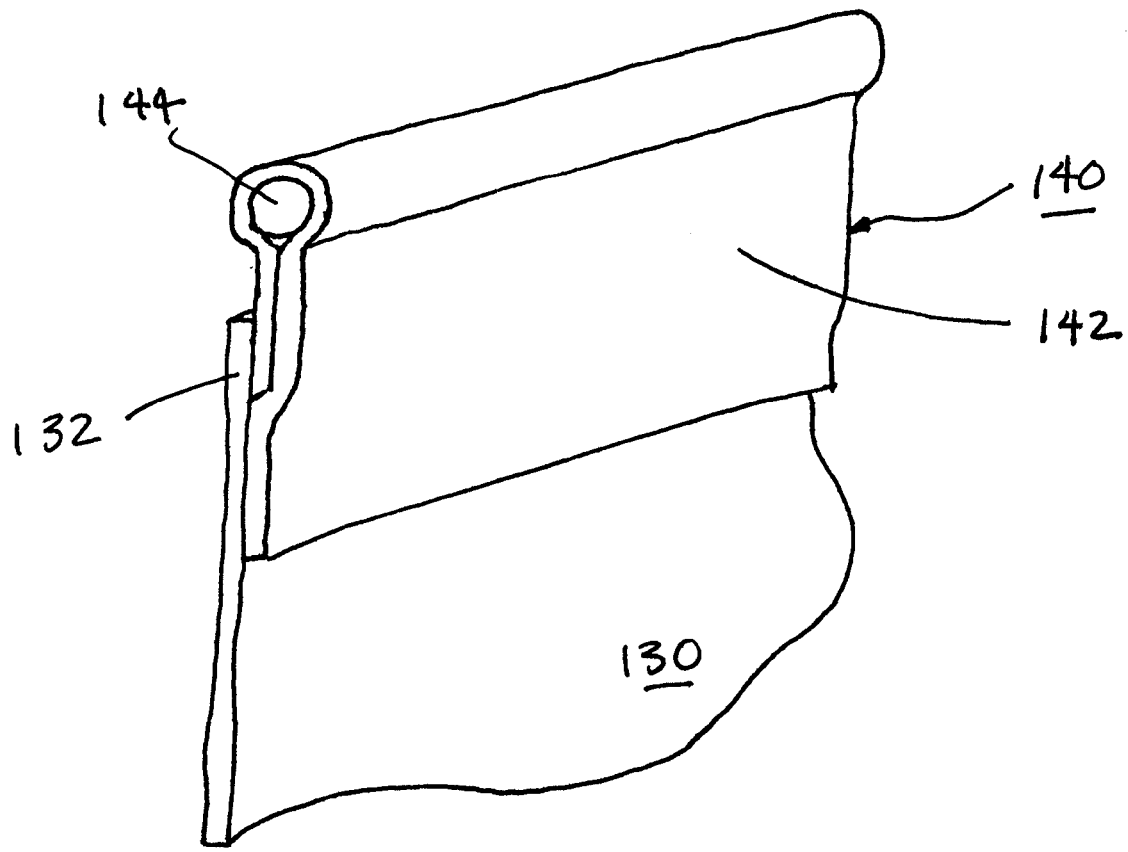
FIG. 3C is a schematic view of another embodiment of the spline as it engages the display panel.
Figure 4:
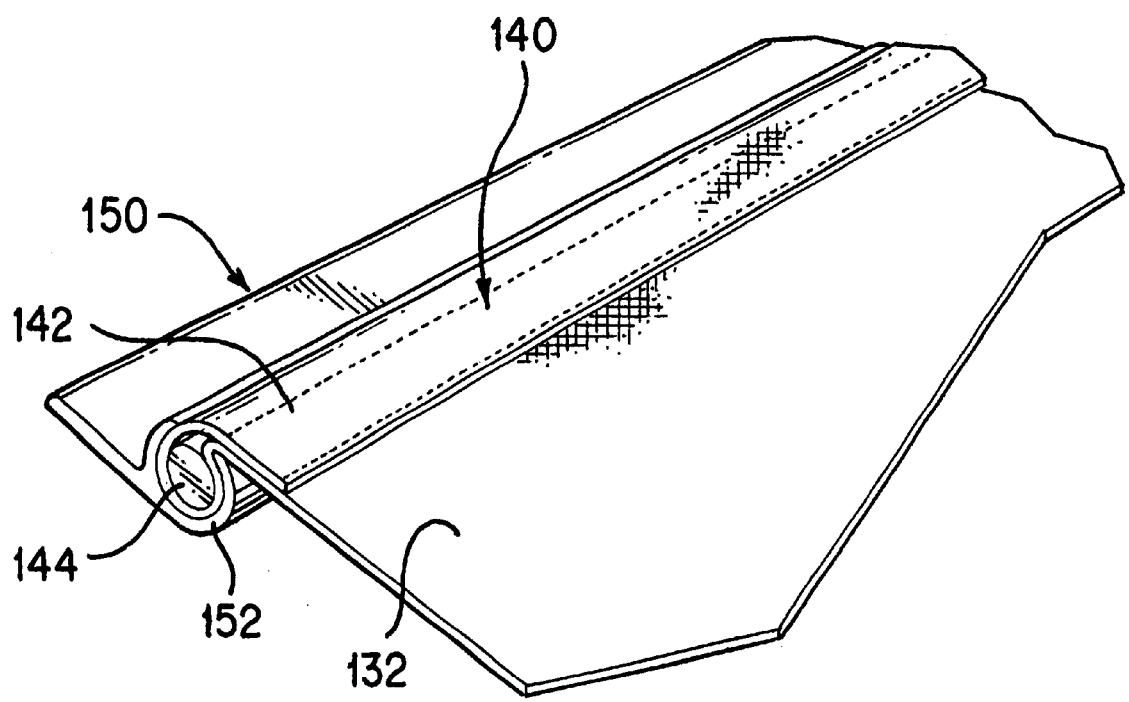
FIG. 4 is a schematic view detailing one embodiment of the receiving member as it engages the spline.

As further shown in FIG. 2 and FIGS. 3A, 3B and 3C, the first attaching area 132 of the display panel 130 is affixed to the door 110 by a spline 140. The spline 140 includes an attaching member 142 and an adjacent bead member 144. The attaching member 142 is affixed to at least a portion of the first attaching area 132 of the display panel 130. FIGS. 3A, 3B and 3C illustrate the spline 140 in greater detail. FIG. 3A shows a first embodiment of the spline 140, wherein the bead member 144 and the attaching member 142 are molded, extruded or otherwise formed as a unitary assembly. The bead member 144 may be of a solid or hollow construction. FIGS. 4 and 3C illustrates another embodiment of the spline 140, wherein the bead member 144 and attaching member 142 are separate pieces which are joined to form the spline 140. In such an embodiment, the bead member 144 may be constructed of semi-rigid polyethylene, and the attaching member 142 may be constructed of vinyl polyester or vinyl nylon fabric. The fabric may be wrapped around the bead member 144 and the resulting overlapping edges sewn or welded to capture the bead member 144, said overlapping sewn or welded edges forming the attaching member 142. Welding of the fabric around the bead member 144 to construct the spline may be accomplished by Radio Frequency ("RF") welding, wherein pressure and mechanical vibrations at radio frequencies are applied to the overlapping edges of fabric to bond the fabric edges to each other. The weld may also be accomplished by other welding methods or by utilization of an adhesive to effect the intimate contact between the overlapping fabric edges.

The spline 140 may be connected to the display panel 130 by welding the attaching member 142 to the first attaching area 132 of the panel 130. This connection may also be accomplished by stitching or sewing the attaching member 142 to the first attaching area 132 of the panel 130.

In another embodiment, the spline 140 may be formed directly from the first attaching area 132 of the panel 130. In such an embodiment, a hem may be formed by forming a tube or pocket of the panel material in the first attaching area 132. The bead member 144 may then be inserted in the hem, and the hem material stitched, sewn or welded as described above to capture the bead member 144. In such an embodiment, the hem forms the attaching member 142.

FIG. 3B shows a second embodiment of the spline 240, wherein the attaching member 242 comprises a pair of opposite flaps 246, which may receive the first attaching area 132 of the panel 130 therebetween, and be affixed by welding, sewing, or stitching as described above.

Referring again to FIG. 4, retention of the first attaching area 132 to the door 110 is accomplished by retention of the spline 140 by the receiving member 150, attached to the exterior surface 120 of the door 110. In one embodiment, the receiving member 150 is attached to the door 110 adjacent the leading edge 112, but in other embodiments, the receiving member may be attached to the door 110 at other locations along its length. Depending on the desired location of the display panel 130, the location of the receiving member 150 may be selected by the user. The receiving member 150 generally defines a keyway 152 which is capable of engaging and retaining the bead member 144 so as to attach the spline 140 to the receiving member 150. The bead member 144 may be substantially circular in cross section, and the receiving member 150 may complementarily define a substantially circular keyway 152 for receiving the bead member 144 therein. Alternately, the keyway 152 and the bead member 144 may be of any cross sectional shapes (e.g. square or triangular). The keyway 152 used in conjunction with any particular bead member 144, however, must be of a shape which is capable of receiving and retaining the selected bead member 144 therein.

Referring again to FIG. 2, the second attaching area 134 of the display panel 130 is retained to the door 110 by a plurality of spaced apart elastic members 160 that connect the second attaching edge 134 to an attaching structure 170. Again, in one embodiment, the attaching structure 170 may be attached to the door 110 adjacent the trailing edge 114. In other embodiments, the attaching structure 170 may be affixed to the door 110 at any location selected by the user, depending on the size of the panel 130 and the desired location of the panel 130 within the door 110.

Figure 5A:
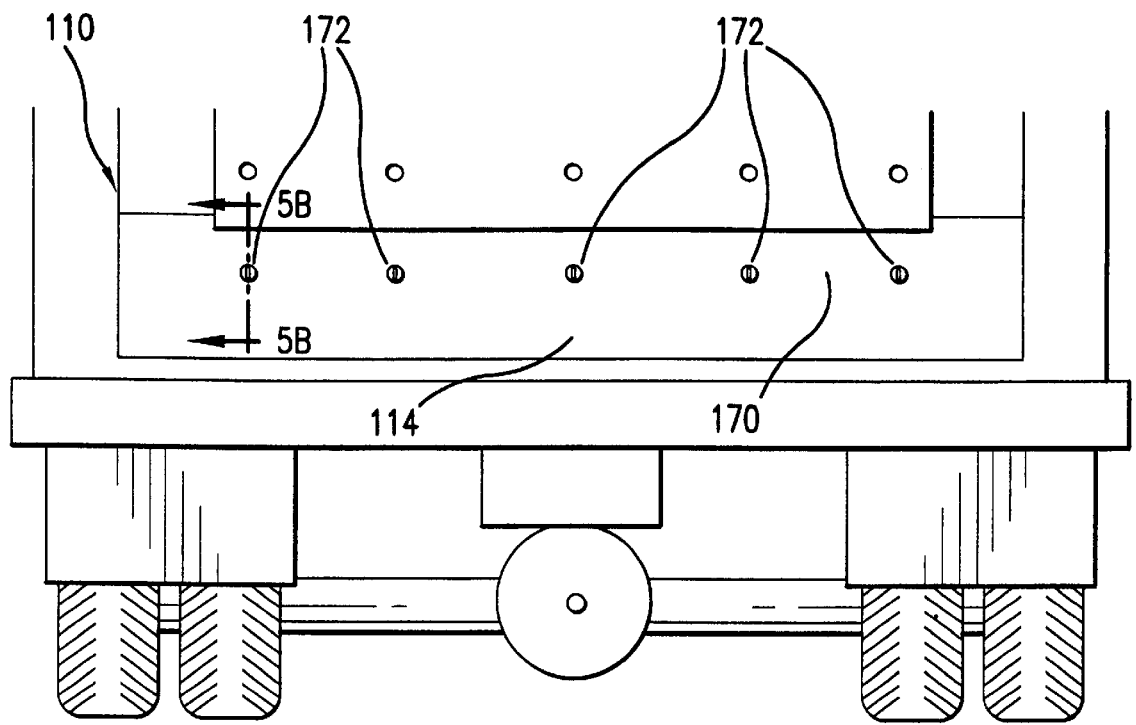
FIG. 5A is a sectional schematic view detailing one embodiment of the attaching structure, comprising a plurality of spaced apart eye-bolts.
Figure 5B:
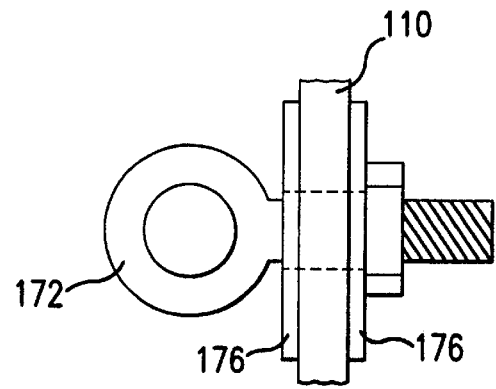
FIG. 5B is a sectional schematic view of an embodiment of an eye-bolt, taken along direction 5B—5B of FIG. 5A.

A plurality of elastic members 160 may be utilized to retain the panel 130. In an embodiment wherein a display panel 130 of rectangular or square shape is employed, best results will be obtained by utilizing a minimum of two elastic members 160, one to secure each corner of the second attaching area 134 of the display panel 130. By making use of greater numbers of elastic members 160, the user may increase the tension maintained within the display panel 130. Alternatively, tension may be adjusted by utilizing elastic members 160 of varying weights or elasticities. Elastic members 160 which exert a greater tensioning force when stretched will provide greater tension within the display panel 130. As shown in FIG. 5A, the attaching structure 170 may include a plurality of spaced apart eye-bolts 172 affixed to the door 110 along the trailing edge 114, wherein each eye-bolt 172 is capable of engaging an elastic member 160. Fender washers 176 on the inside and outside of the door 110, secured with a nut, may be utilized to attach the eye-bolt 172 to the door.

Figure 6:
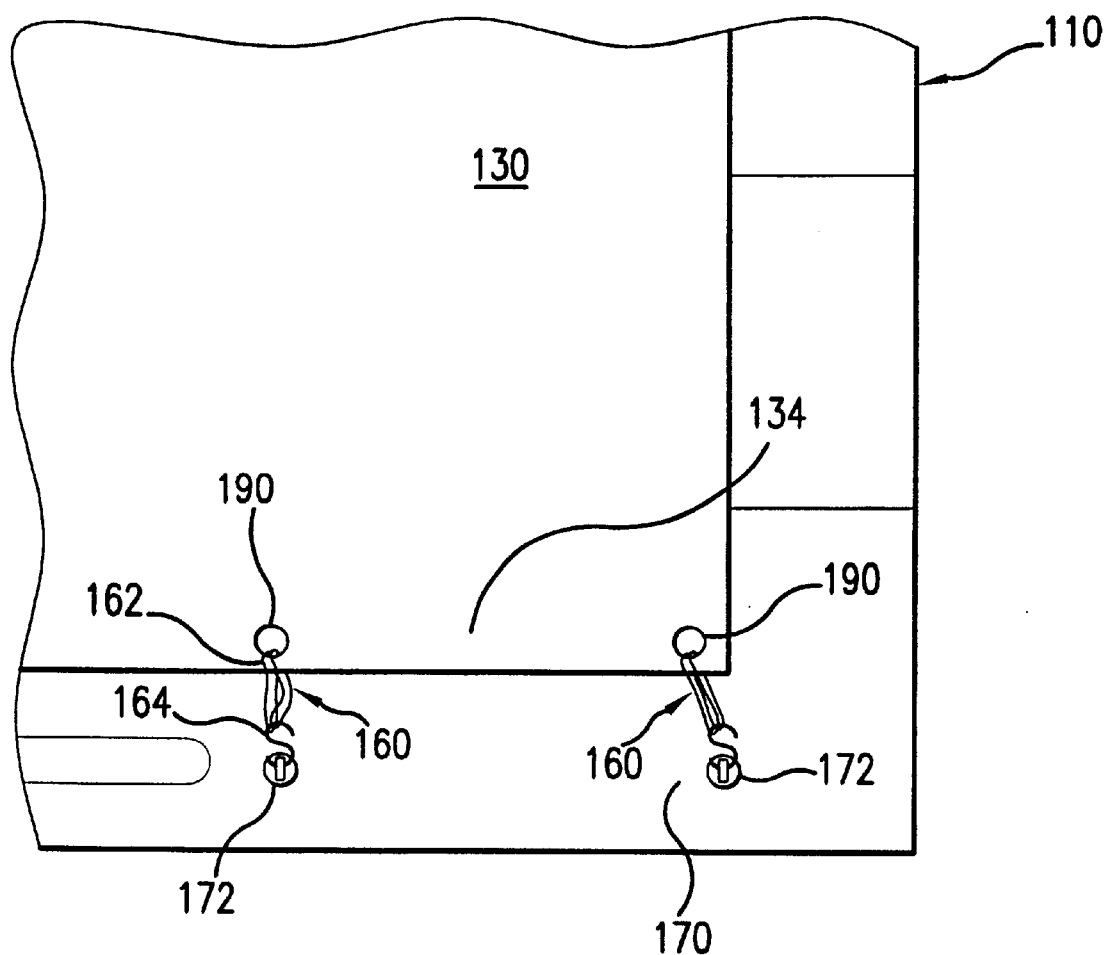
FIG. 6 is a sectional schematic view of an orientation of elastic members utilized to retain the second attaching area of the display panel to the attaching structure.

Referring now to FIG. 6, the second attaching area 134 of the display panel 130 is fastened to the attaching structure 170 by a plurality of elastic members 160. Each elastic member 160 includes an elastic coupling 162 and an S-hook 164 engaging the elastic coupling 162, wherein the S-hook 164 connects the elastic coupling 162 to the attaching structure 170. The elastic coupling 162 includes a length of elastic shock cord, commonly referred to as "bungee" cord. In the embodiment pictured in FIG. 6, the elastic coupling 162 is made up of a loop of bungee cord which is threaded through grommets 190, and its looped ends retained to the attaching structure 170 by S-hook 164. Alternate embodiments of the elastic member 160 may include a multitude of devices, including a length of bungee cord with integrally connected hooks attached to its ends, rubber or elastic bands, metal springs, rubber stripping, and spring scales (not shown). By utilizing elastic members 160 in fastening the second attaching area 134 of the panel 130, the elastic members 160 maintain and regulate tension in the panel 130 throughout the range of motion of the door 110.

The elastic members 160 engage the second attaching area 134 of the panel 130 by engaging a plurality of spaced apart grommets 190, each defining an opening passing through the second attaching area 134 of the panel 130. As further demonstrated in FIG. 6, the second attaching area 134 of the panel 130 is fastened to the attaching structure 170 by connecting each grommet 190 to a generally corresponding and generally vertically aligned eye-bolt 172. It has been observed that such an arrangement of elastic members 160 provides the desired degree of retention of the display panel 130 during use. In another embodiment, elastic members 160 may be fastened to the second attaching area 134 only at the corners thereof, providing for retention of the display panel 130. Various quantities of elastic members 160 arranged in various configurations will provide satisfactory retention of the display panel 130. Elastic members 160 of greater elasticity will provide less tension within the panel 130, while increasing the number of elastic members 160 used to retain the panel 130 will correspondingly increase the tension provided within the panel 130. The selected arrangement of elastic members 160 should provide tension within the panel 130 throughout the range of motion of the door 110 so that the panel 130 is maintained securely in position without damaging the panel 130 or the mounting devices.

Figure 7A:
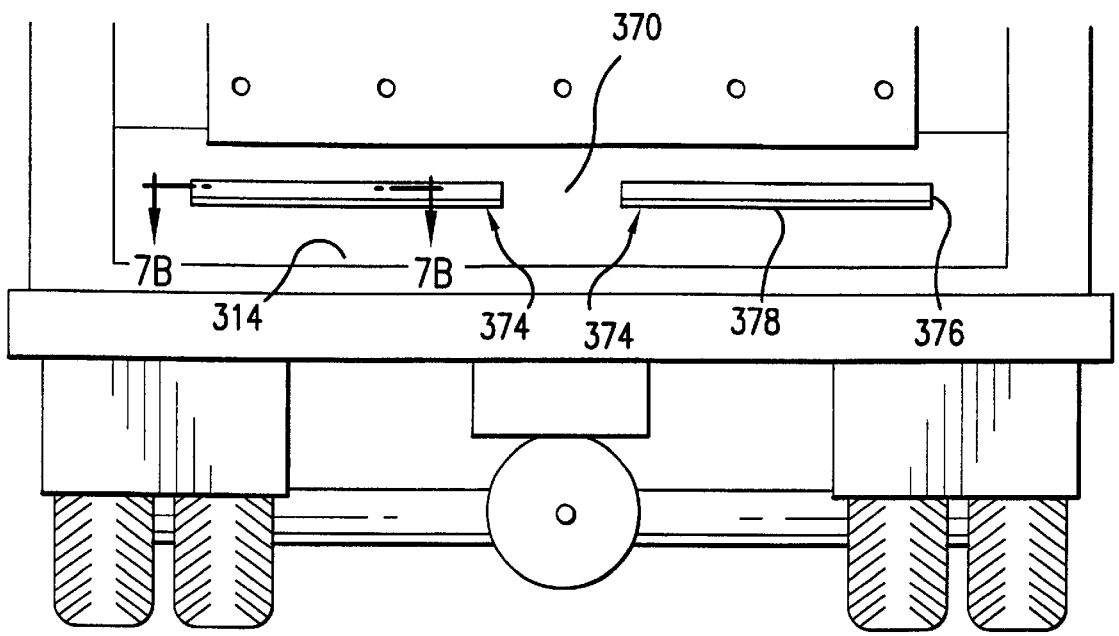
FIG. 7A is a sectional schematic view detailing a second embodiment of the attaching structure, comprising a section of angle iron.
Figure 7B:
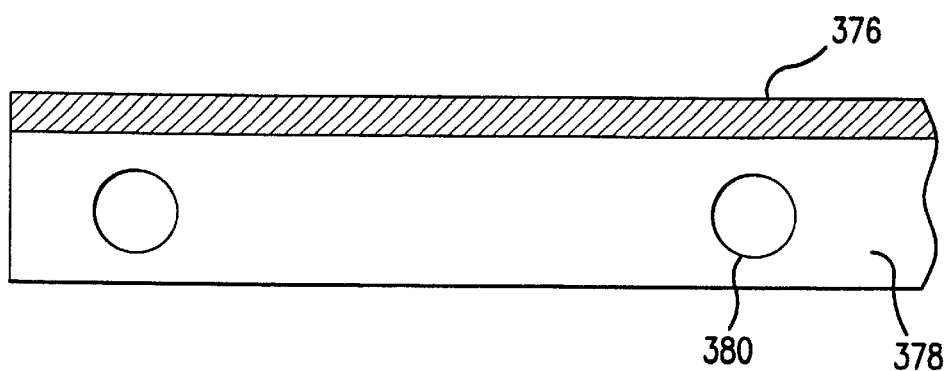
FIG. 7B is a sectional schematic view of the spaced apart holes in the second elongated plate of the second embodiment of the attaching structure, taken along direction 7B—7B of FIG. 7A.
Figure 3C:
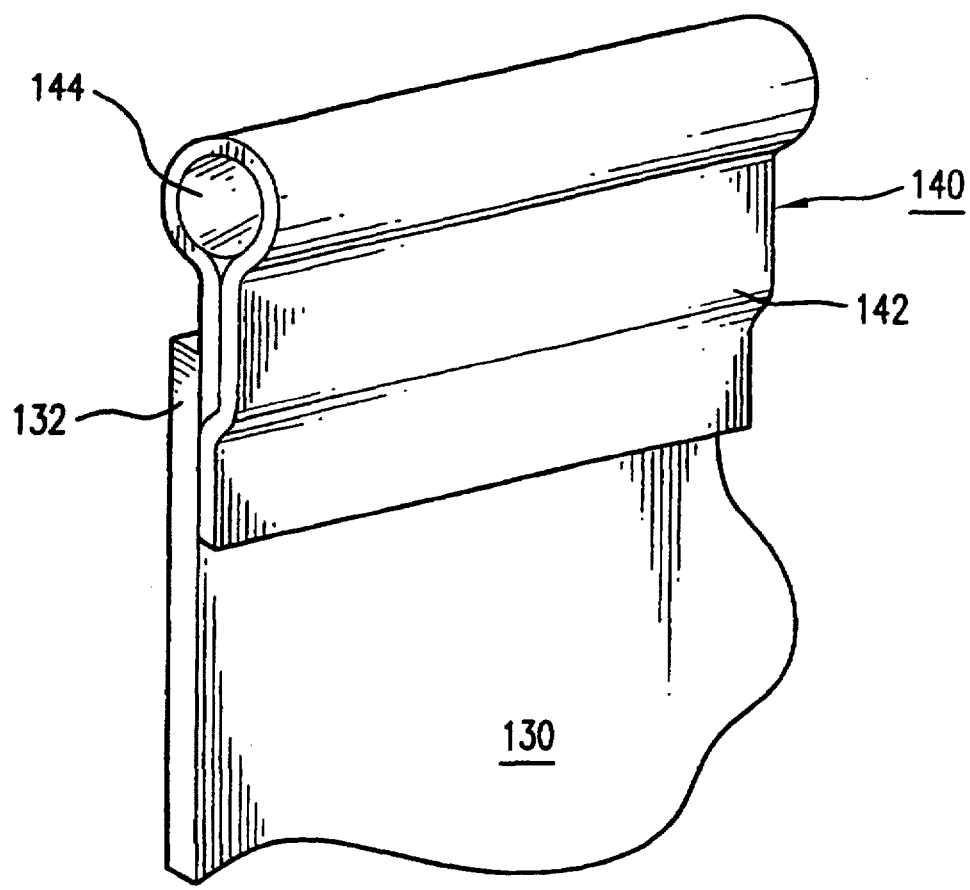

In another embodiment, as depicted in FIG. 7A, the attaching structure 370 comprises an angled section or sections 374 such as the L-shaped angle iron shown. Each angled section 374 has a first elongated plate 376 attached to the door 310 along the trailing edge 314. A second elongated plate 378 extends transversely from the first elongated plate 376. The second elongated plate 378 defines a plurality of spaced apart holes 380 extending through the second elongated plate 378. Each hole 380 is capable of engaging an elastic member 360. The angled section 374 may be formed of iron, steel, aluminum, hard plastic, or other rigid materials. The first and second elongated plates 376 and 378 may form a 90-degree angle therebetween, or any other angle which allows the user to access the spaced apart holes 380 with the elastic members 160.

Other embodiments of the attaching structure 170 may be employed, so long as they provide a structure securely affixed to the door 110 that is capable of engaging a plurality of elastic members 160 in order to secure the display panel 130 to the door 110. For example, attaching structures 170 which utilize hook and loop (velcro) fasteners, snap fasteners, or magnets may be employed. Additionally, alternate bolt designs may be substituted for the eye-bolts 172 described above. For example, eye-bolts with a unitary shoulder portion, elevator bolts, carriage bolts or pad-eyes, which are known in the art, may be substituted for eye-bolts 172.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What I claim is:

1. A mobile advertising display, comprising:
   a. a flexible display panel having a first attaching area, an opposite second attaching area, a first surface, and an opposite second surface, the first surface and the second surface each capable of carrying an image;
   b. a spline, including an attaching member and an adjacent bead member, the attaching member affixed to at least a portion of the first attaching area of the display panel, the spline further comprising a sheet of fabric having opposing edges, the sheet being disposed around and joined to the bead member and the opposing edges being bound together to form the attaching member;
   c. a receiving member, attached to the exterior surface of a segmented trailer door capable of moving through a range of motion, the receiving member defining a keyway, the keyway being complementary in shape to the bead member so as to be capable of affixing the spline to the receiving member;
   d. an attaching structure attached to the exterior surface of the door; and
   e. a plurality of spaced apart elastic members that connect the second attaching area to the attaching structure, whereby the elastic members maintain and regulate tension in the panel throughout the range of motion of the door.

2. The apparatus of claim 1, wherein the display panel is substantially rectangular in shape.

3. The apparatus of claim 1, wherein the bead member is substantially circular in cross section.

4. The apparatus of claim 1 wherein the attaching structure comprises a plurality of spaced apart eye-bolts affixed to the door along the trailing edge, each eye-bolt capable of engaging at least one of the plurality of elastic members.

5. The apparatus of claim 1, wherein the attaching structure comprises:

a. a first elongated plate attached to the door along the trailing edge; and b. a second elongated plate transversely extending from the first elongated plate member, the second elongated plate defining a plurality of spaced apart holes extending there through, each hole capable of engaging at least one of the plurality of elastic members.

6. The apparatus of claim 5, wherein the attaching structure is substantially L-shaped in cross section.

7. The apparatus of claim 1, wherein the second attaching edge of the display panel is defined by a plurality of spaced apart grommets, each defining an opening passing therethrough, each grommet capable of engaging at least one of the plurality of elastic members.

8. The apparatus of claim 7, wherein each elastic member comprises:

a. an elastic coupling; and b. an S-hook engaging the elastic coupling, wherein the S-hook connects the elastic coupling to the attaching structure.

9. The apparatus of claim 8, wherein each elastic coupling comprises a segment of elastic shock cord.

10. The apparatus of claim 1, wherein the display panel comprises a fabric.

11. The apparatus of claim 10, wherein the fabric comprises vinyl polyester laminate.

12. The apparatus of claim 10, wherein the fabric comprises vinyl coated polyester.

13. A mobile advertising display, comprising:

a. a flexible display panel having a first attaching edge, an opposite second attaching edge, a first side edge, an opposite second side edge, a first surface and an opposite second surface, the first surface and the second surface each capable of carrying an image;

b. a spline, including an attaching member and an adjacent bead member, the attaching member affixed to the first attaching edge of the display panel, the spline further comprising a sheet of fabric having opposing edges, the sheet being disposed around and joined to the bead member and the opposing edges being bound together to form the attaching member;

c. a receiving member defining a keyway, attached to the exterior surface of a segmented trailer door capable of moving through a range of motion, the door having a leading edge and an opposite trailing edge, the keyway being attached to the leading edge of the door, the keyway further being complementary in shape to the bead member and capable of affixing the spline to the keyway;

d. a plurality of spaced apart eye-bolts, each affixed to the door along the trailing edge;

e. a plurality of spaced apart grommets passing through the display panel along the second attaching edge, each defining an opening passing there through; and f. a plurality of elastic members, each having an elastic coupling and an S-hook engaging the elastic coupling and connecting the elastic coupling to an eye-bolt, each elastic member capable of engaging a grommet, whereby the elastic members maintain and regulate tension in the panel throughout the range of motion of the door.

14. A mobile advertising display, comprising:

a. a segmented trailer door capable of moving through a range of motion, the door having a leading edge, an opposite trailing edge, a first edge transverse to the leading edge, an opposite second edge, an exterior surface, and an opposite interior surface;

b. a flexible display panel having a first attaching area, an opposite second attaching area, a first surface, and an opposite second surface, the first surface and the second surface each capable of carrying an image;

c. a spline, including an attaching member and an adjacent bead member, the attaching member affixed to at least a portion of the first attaching area of the display panel, the spline further comprising a sheet of fabric having opposing edges, the sheet being disposed around and joined to the bead member and the opposing edges being bound together to form the attaching member;

d. a receiving member, attached to the exterior surface of the door, defining a keyway, the keyway being complementary in shape to the bead member so as to be capable of affixing the spline to the receiving member;

e. an attaching structure attached to the exterior surface of the door; and f. a plurality of spaced apart elastic members that connect the second attaching area to the attaching structure, whereby the elastic members maintain and regulate tension in the panel throughout the range of motion of the door.

15. A mobile advertising display, comprising:

a. a flexible display panel having a first attaching area, an opposite second attaching area, a first surface, and an opposite second surface, the first surface and the second surface each capable of carrying an image;

b. a spline, including an attaching member and an adjacent bead member, the attaching member affixed to at least a portion of the first attaching area of the display panel;

c. a receiving member, attached to the exterior surface of a segmented trailer door capable of moving through a range of motion, the receiving member defining a keyway, the keyway being complementary in shape to the bead member so as to be capable of affixing the spline to, the receiving member;

d. an attaching structure attached to the exterior surface of the door; and e. a plurality of spaced apart elastic members that connect the second attaching area to the attaching structure, whereby the elastic members maintain and regulate tension in the panel throughout the range of motion of the door, wherein the spline is a unitary member in which the attaching member and the bead member are fabricated of a like material and are fixedly joined to one another.

16. A mobile advertising display, comprising:

a. a flexible display panel having a first attaching area, an opposite second attaching area, a first surface, and an opposite second surface, the first surface and the second surface each capable of carrying an image;

b. a spline, including an attaching member and an adjacent bead member, the attaching member affixed to at least a portion of the first attaching area of the display panel;

c. a receiving member, attached to the exterior surface of a segmented trailer door capable of moving through a range of motion, the receiving member defining a keyway, the keyway being complementary in shape to the bead member so as to be capable of affixing the spline to the receiving member;

d. an attaching structure attached to the exterior surface of the door; and e. a plurality of spaced apart elastic members that connect the second attaching area to the attaching structure, whereby the elastic members maintain and regulate tension in the panel throughout the range of motion of the door, wherein the spline is a unitary member in which the attaching member and the bead member are fixedly joined to one another.

* * * * *

UNITED STATES PATENT AND TRADEMARK OFFICE
CERTIFICATE OF CORRECTION

PATENT NO.   : 6,282,822 B1
DATED        : September 4, 2001
INVENTOR(S)  : Rinzler et al.

It is certified that error appears in the above-identified patent and that said Letters Patent is hereby corrected as shown below:

Drawings,
Please replace informal Figure 3C with formal Figure 3C as attached hereto.

Signed and Sealed this

Sixteenth Day of April, 2002

*Attest:*

*Attesting Officer*

JAMES E. ROGAN
*Director of the United States Patent and Trademark Office*